(12) United States Patent
Gayer

(10) Patent No.: US 10,524,624 B2
(45) Date of Patent: Jan. 7, 2020

(54) SELF-CONTAINED CABINET URINAL SYSTEMS

(71) Applicant: Robert E Gayer, Tempe, AZ (US)

(72) Inventor: Robert E Gayer, Tempe, AZ (US)

( * ) Notice: Subject to any disclaimer, the term of this patent is extended or adjusted under 35 U.S.C. 154(b) by 190 days.

(21) Appl. No.: 15/409,672

(22) Filed: Jan. 19, 2017

(65) Prior Publication Data

US 2017/0258280 A1 Sep. 14, 2017

Related U.S. Application Data

(60) Provisional application No. 62/308,016, filed on Mar. 14, 2016.

(51) Int. Cl.
*A47K 11/03* (2006.01)
*A47K 11/12* (2006.01)

(52) U.S. Cl.
CPC ............ *A47K 11/035* (2013.01); *A47K 11/12* (2013.01); *Y02A 50/456* (2018.01)

(58) Field of Classification Search
CPC ...... A47K 11/00; A47K 11/035; A47K 11/03; A47K 11/12; Y02A 50/456
USPC ................................................... 4/144.1, 462
See application file for complete search history.

(56) References Cited

U.S. PATENT DOCUMENTS

| | | | | |
|---|---|---|---|---|
| 4,929,428 A * | 5/1990 | Tezuka | .................. | B01L 3/0234 422/515 |
| 5,024,135 A * | 6/1991 | Bender | .................. | F42B 33/004 86/27 |
| 5,317,764 A * | 6/1994 | Barker | .................... | A47K 11/02 4/449 |
| 5,336,469 A * | 8/1994 | Tobiki | ........................ | B01J 4/02 141/352 |
| 6,047,414 A * | 4/2000 | Bailey | .................... | A47K 11/02 4/484 |
| 6,684,414 B1 * | 2/2004 | Rehrig | .................... | A47K 11/12 4/144.1 |
| 9,719,274 B2 * | 8/2017 | Allred | .................. | B05B 11/3052 |
| 9,909,286 B2 * | 3/2018 | Meressa | .................... | A47K 4/00 |
| 9,925,932 B2 * | 3/2018 | Julian | ..................... | B60R 15/04 |
| 2009/0105675 A1 * | 4/2009 | Romero | ................. | A61G 9/006 604/349 |
| 2010/0275362 A1 * | 11/2010 | Biesinger | ............... | A47K 11/02 4/483 |
| 2011/0054426 A1 * | 3/2011 | Stewart | ................. | A61F 5/4556 604/347 |
| 2011/0114660 A1 * | 5/2011 | Johansson | ............. | A61F 15/001 221/43 |
| 2014/0259353 A1 * | 9/2014 | van der Linde | ...... | E04H 1/1216 4/461 |
| 2014/0303584 A1 * | 10/2014 | Keating | .................. | A61F 13/84 604/378 |

* cited by examiner

*Primary Examiner* — Christopher R Harmon

(57) ABSTRACT

A portable urine disposal cabinet system. The system is a cabinet enclosure with privacy side wings which open as doors to allow the user to urinate in the cup with a sufficient level of privacy. The unit is self-contained and designed to provide a private and efficient means by which an individual (man or woman) can urinate in a cup. Once the cup is filled with urine a media mixture is manually dispensed via mechanical action into the cup of urine to remove the odor and gel/absorb the urine such that the filled cup can be disposed of in a garbage. The cabinet also has a holder for storing unused cups and lids and funnels.

17 Claims, 7 Drawing Sheets

SELF-CONTAINED CABINET URINAL SYSTEMS

CROSS-REFERENCE TO RELATED APPLICATION

The present application is related to and claims priority from prior provisional application Ser. No. 62/308,016, filed Mar. 14, 2016 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is t 1. Background of the Invention The present invention relates generally to the field of urinals and more specifically relates to a self-contained cabinet urinal.

2. Description of Related Art

Many buildings in modern society have indoor plumbing and washroom facilities. Buildings being built and others without indoor plumbing may not have ready access to those needing to use washroom facilities. A portable toilet may be used which is a simple portable enclosure containing a chemical toilet (a toilet bowl filled with disinfectant instead of water), and is typically used as a temporary toilet for construction sites or large gatherings because of its durability and convenience. Most portable toilets have black open-front U-shaped toilet seats with a cover. They are often constructed out of lightweight molded plastic. These may be expensive to rent and undesirable to use especially in warm weather.

Since portable toilets are not plumbed, they retain the waste inside the bathroom; this can lead to a sewage smell if the portable toilet is not cleaned properly or is overused without being dumped. They may also be seen as an eyesore in most communities, some of which prohibit the use of a portable toilet without special permission from the city or municipality. This is not desirable.

Various attempts have been made to solve problems found in the portable toilet art. Among these are found in: U.S. Patent and Publication Nos. 2008/0163411; 2009/0249532; U.S. Pat. No. 8,495,769; 2014/0038172; and U.S. Pat. No. 6,079,770. This prior art is representative of attempts to improve the convenience of portable toilets.

None of the above inventions and patents, taken either singly or in combination, is seen to describe the invention as claimed. Thus, a need exists for a reliable self-contained cabinet urinal system, and to avoid the above-mentioned problems.

BRIEF SUMMARY OF THE INVENTION

The present invention advantageously fills the aforementioned deficiencies by providing a urinating and disposal solution that is discrete, self-contained, portable, and unisex. The present invention is superior to other systems in that it effectively eliminates the need for toilets with external hook-ups when such infrastructure is not already in place for ready use.

The disclosed invention is a portable urine disposal cabinet system. The system in one embodiment comprises a cabinet enclosure with privacy side wings which open as doors to allow the user to urinate in the cup with a sufficient level of privacy. The unit is self-contained and designed to provide a private and efficient means by which an individual (man or woman) can urinate in a cup container. Once the cup is filled with urine a media mixture is manually dispensed via mechanical action into the cup of urine to remove (minimize to near zero) the odor and gel/absorb the urine such that the filled cup can be disposed of in a garbage. The cabinet contains a hopper that can be filled with media and dispensed via a mechanical valve. The valve has at least 4 positions in these embodiments. The cabinet also comprises a holder for storing unused cups and lids and funnels. The present invention requires no power source thus is particularly suited for remote use on construction sites and the like.

The portable urine disposal cabinet system of this particular embodiment comprises an inner volume (interior) of the station with privacy doors being in an open condition, cup filled with urine being held ready for a granular mix to be introduced to 'gel' the urine according to an embodiment of the present invention. The user stands in front of the urinal cabinet and opens vanity wings placing handle in-use position; handle sets within a recess so vanity wings can close flush along front of cabinet. The user pulls a cup (a 20 fl. oz. Styrofoam by way of exemplary means) from one of the two (2) cup sleeves. The inward dimples of which there are four (4) at 90 degrees to one another and will allow one cup at a time to be removed.

Means for mounting the cabinet of the portable urine disposal cabinet system, allow the entire cabinet to be raised or lowered to the height comfortable for a user by lifting and moving cabinet to the right. In this way the user may raise or lower to a comfortable height, the mounting bolts left protrude from a wall or other mounting structure and the heads are inserted through holes. The keyway slots and channels are narrowed as to not allow the head of bolts to slip out.

The cup is placed in a cup holder and now a male is ready to urinate. A female may choose to use a paper funnel to aid in the urine flow into cup; these may be stored in a niche. With handle in the lower position butterfly valve is closed and upper butterfly valve is open.

Sight glass is for the purpose of easily performing a visual check on the volume of media (which is a mixture of three non-toxic, bio-degradable ingredients) within a hopper and fill port is to re-fill hopper with media. Media now fills middle chamber, which is sized for the proper amount of media to neutralize 12 fl. oz. of urine, this being medically recognized as the usual amount of urine that an average adult will void at one time. The pillow block and dead stops, supports and stops rotation of lower shaft. Lower shaft also gets support as it passes through bulkheads. After urination the user slowly rotates handle in a clockwise direction, 90 degrees to position 'FLUSH'.

During this 'FLUSH' movement the first 10 degrees will close upper butterfly valve. Handle is attached to and rotates main shaft and with two (2) connecting rods, connects dual pitman (as one end pushes the other end pulls) to slides with a fastener thru hole. Gearing components of the portable urine disposal cabinet system serve to operate a pair of butterfly valves to facilitate dispensing of the granular mix (gel media) according to an embodiment of the present invention. The gearing components of the portable urine disposal cabinet system serve to operate a pair of butterfly valves to facilitate dispensing of the granular mix (gel media).

Through the slides linear movement rack comes in contact with and rotates the gear which in turn rotates butterfly valves. Rotating the valves 90 degrees closes upper butterfly valve in the first ten (10) degrees of travel and opens the lower butterfly valve in the last ten (10) degrees. The approximately seventy (70) degrees of travel between these two actions slides has no effect on the valves as gears glides over the top of step.

There is a flat machined surface on both valve shafts as gear is no longer engaged with the rack gear this flat glides just above the top of step keeping valves from moving and getting 'out of time'. This 70 degree of movement lifts cup holder and cup, through a belt attached between main shaft and lower shaft drum, which is attached to lower shaft, being of the same diameter and perpendicular to one another, up and into position under lower butterfly valve.

The swivel standoffs attaches cup holder to lower shaft, allowing cup to remain in a near vertical position during transition from 'USE' to 'FLUSH'. The bulkheads compartmentalize cabinet as well as provide support for lower shaft and adds overall rigidity to the cabinet. The final 10 degrees opens the lower valve and media drops into cup, where within one to two minutes the urine is neutralized, gelled and odor free. When handle is moved to position 'DISCARD', this closes valve and lowers cup holder enough to place a lid, also stored in niche, on the (now used) cup and cup (with gelled urine therein) is disposed of in a waste receptacle. Handle is moved to position #4 'NEST' and cup holder is now inside of cabinet; vanity wings may then be closed.

Hopper is filled with a mixture (media), a blend of Sodium Polyacrylate, silica gel and a product to help control odor such as the product called SMELLEZE®. Other blends may be used. With handle in position #1 upper butterfly valve is open and lower butterfly valve is closed. The lower chamber which is sized for the amount of media to absorb approximately 12 fl. oz. of urine, medically recognized as the approximate amount that an adult will void at one time, is now filled.

Vanity wings may be then opened and a 20 oz. cup removed from the lower right side of the unit and placed into cup holder ready for usage. After the user urinates he/she rotates handle towards the #2 position, handle is attached to main shaft which has a pitman arm that one end pulls as the other end pushes. Using tie rods attached to sliding mechanisms now moves a rack under a gear that rotates the butterfly valves. Butterfly valves may be held in place when not engaged with the rack this keeps the valves in 'time', otherwise valves could be displaced during shipping, moving, etc. As the user moves handle towards #2 position the first approximately 10 degrees of movement closes upper butterfly valve and through a drive belt from main shaft to lower shaft the next approximately 70 degrees of travel raises cup holder up under the lower chamber and the last approximately 10 degrees opens lower butterfly valve allowing media to drop into cup where the urine is absorbed and or gelled.

Handle can now be moved to the #3 position where the user places a lid on cup, which is now suitable to be removed and discarded in a waste container. Handle can now be moved to the #4 position or 'nest', vanity wings can be closed and the process completed. Anywhere within the 70 degrees of travel between #3 and #4 positions both valves are closed and no media is loaded and/or dropped. In this way the present invention may be used as a portable means for urination in a comfortable and discrete way.

Other embodiments of the present invention may comprise auger(s) and various valving systems. Media may comprise about 15% activated carbon, about 70% clay granules, and about 15% Sodium Polyacrylate. Other odor-minimizing, wicking and absorbing means may be used.

A second embodiment disclosed herein may comprise: a cabinet assembly including a housing (having an inner volume; and an outer surface); at least one media hopper; a mechanical lever assembly; and a dispenser; wherein the self-contained cabinet urinal system comprises the cabinet assembly. The cabinet assembly comprises in functional combination the housing, the at least one media hopper, the mechanical lever assembly, and the dispenser.

Referring now to the housing; the housing is defined by the inner volume and the outer surface; wherein the housing is structured and arranged for providing mounting means for the at least one media hopper, the mechanical lever assembly, and the dispenser fastened within the inner volume. The self-contained cabinet urinal system is manually operated and does not require an electrical power source making it cost-effective for use. The mechanical lever assembly comprises a series of levers (or other suitable combination of mechanical means for providing movement); to operate the dispenser which preferably comprises an auger.

Referring now to the auger; the auger comprises at least one flighting which determines a volume of the media to be dispensed via the diameter of the at least one flighting and a pitch (in this way volumes can be predetermined for each dispensing action). The mechanical lever assembly is controlled via at least one handle; wherein the handle is structured and arranged to turn only one revolution per dispense-usage as regulated by at least one disc to prevent wastage, this also providing a specific volume is dispensed each time. The handle is also structured and arranged to turn only clockwise (not counterclockwise). Other dispensing means may be used such as various types of valves, slides etc. In certain embodiments the winged doors may not comprise hinges such that they are able to 'swing' back further to increase privacy for the user.

The self-contained cabinet urinal system further comprises a container-holder. The media is dispensed into a container via mechanical manipulation and gravity in combination. As designed, the at least one media hopper is structured and arranged to provide the media to the dispenser; the dispenser, when manipulated, able to provide a pre-determined amount of the media to be dispensed into the container of collected urine to render the collected urine suitable for convenient disposal in an absorbed and effectively deodorized condition. The collected urine once treated by the media forms with the media into a effectively solidified form.

A kit is also disclosed herein including: the media, the cabinet assembly and a set of user instructions. A method of using a self-contained cabinet urinal system is also described comprising the steps of: (the user-male or -female) urinating into a container; (the user-male or -female) manually operating a mechanical lever assembly to dispense media into the container (with collected urine stored therein); and solidifying the collected urine with the media for disposal. The method may further comprise the step of opening the vanity wings, that when open, provide concealment of a user (male or female) of the self-contained cabinet urinal system during use; the vanity wings able to open and close.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, portable urine disposal cabinet system, constructed and operative according to the teachings of the present disclosure.

FIG. 6A is a side view illustrating the disc according to an embodiment of the present disclosure.

The various embodiments of the present invention will hereinafter be described in conjunction with the appended drawings, wherein like designations denote like elements.

DETAILED DESCRIPTION

As discussed above, embodiments of the present disclosure relate to a urinal and more particularly to a portable, uni-sex and fully self-contained urinal as used to improve the efficiency and convenience of urinating.

Generally speaking, a preferred embodiment of self-contained cabinet urinal system comprises: a cabinet assembly including a housing having an inner volume; and an outer surface; at least one media hopper; a mechanical lever assembly; and a dispenser; wherein the self-contained cabinet urinal system comprises the cabinet assembly. The cabinet assembly comprises in functional combination the housing, the at least one media hopper, the mechanical lever assembly, and the dispenser. The dispenser comprises an auger in this preferred embodiment.

The housing is defined by the inner volume and the outer surface; wherein the housing provides mounting for the at least one media hopper, the mechanical lever assembly, and the dispenser within the inner volume. The housing also comprises vanity wings that when open provide concealment of a user of the self-contained cabinet urinal system during use; the vanity wings able to open and close.

The at least one media hopper is structured and arranged to provide media to the dispenser; the dispenser, when manipulated, able to provide a pre-determined amount of the media to be dispensed into a container of collected urine to render the collected urine suitable for convenient disposal in an absorbed and deodorized condition. The self-contained cabinet urinal system is manually operated thus making it suitable for remote use such as on job sites since the self-contained cabinet urinal system does not require an electrical power source. The mechanical lever assembly comprises a series of levers (or other suitable equivalent may be used).

The auger comprises at least one flighting which determines a volume of the media to be dispensed via a diameter of the at least one flighting and a pitch; wherein the media is dispensed into the container via mechanical manipulation and is gravity fed. The media comprises about 15% activated carbon, about 70% clay granules, and about 15% Sodium Polyacrylate in mixed combination for preferred embodiments; wherein the activated carbon minimizes odors emitted from the collected urine and the Sodium Polyacrylate comprises wicking means to absorb the collected urine. The collected urine once treated by the media forms with the media into a 'solidified' form.

The mechanical lever assembly is controlled via a handle; wherein the handle is structured and arranged to turn only one revolution per dispense-usage as regulated by at least one disc. The handle is structured and arranged to turn only clockwise. The self-contained cabinet urinal system further comprises a container-holder. Containers are preferably cup (s) and are held one at a time via the container holder.

Figure 1:
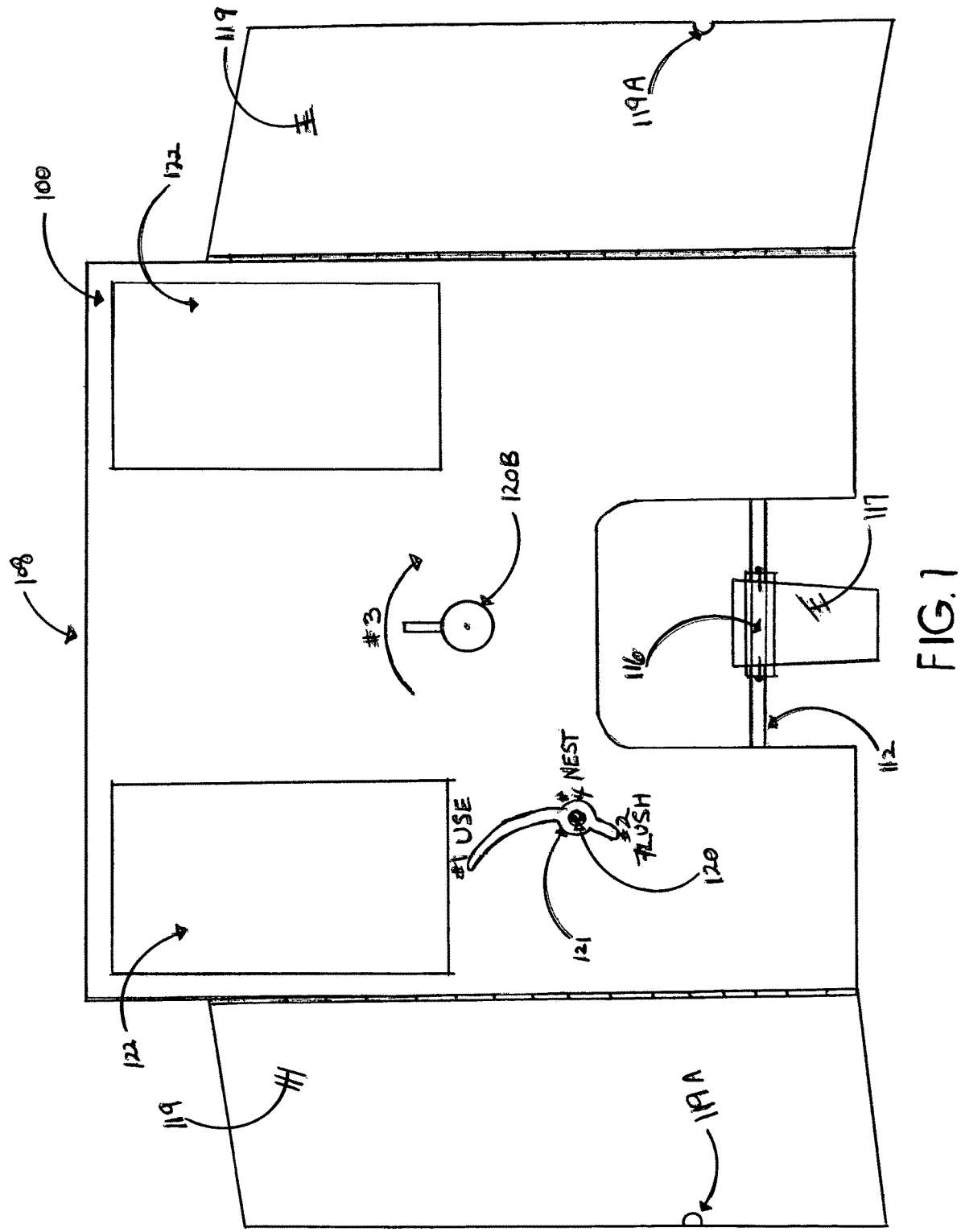
FIG. 1 shows a front view illustrating a portable urine disposal cabinet system in an 'in-use' condition according to an embodiment of the disclosure.
Figure 2:
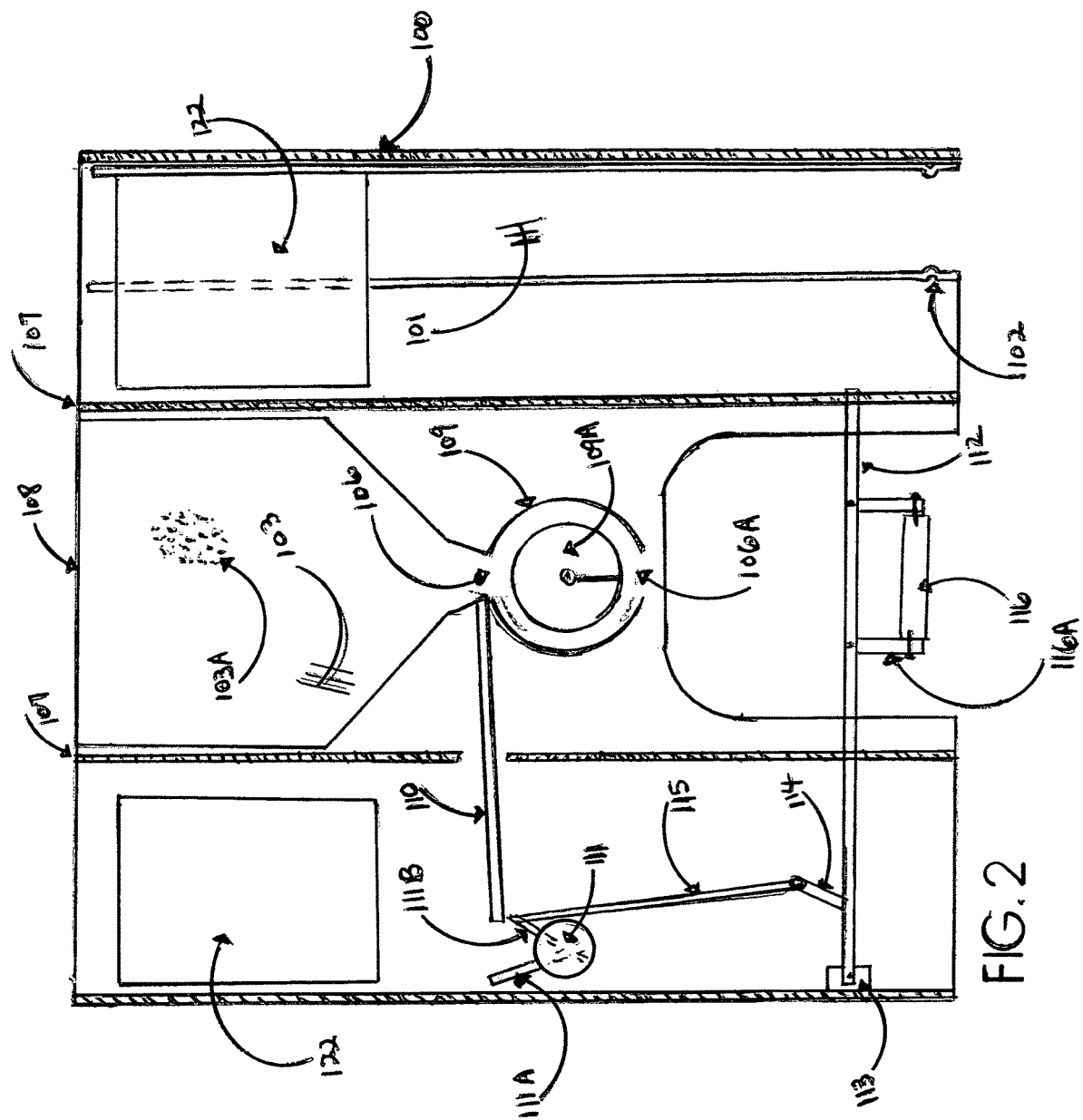
FIG. 2 is an inner view illustrating the portable urine disposal cabinet system comprising working components according to an embodiment of the present invention of the disclosure.
Figure 3:
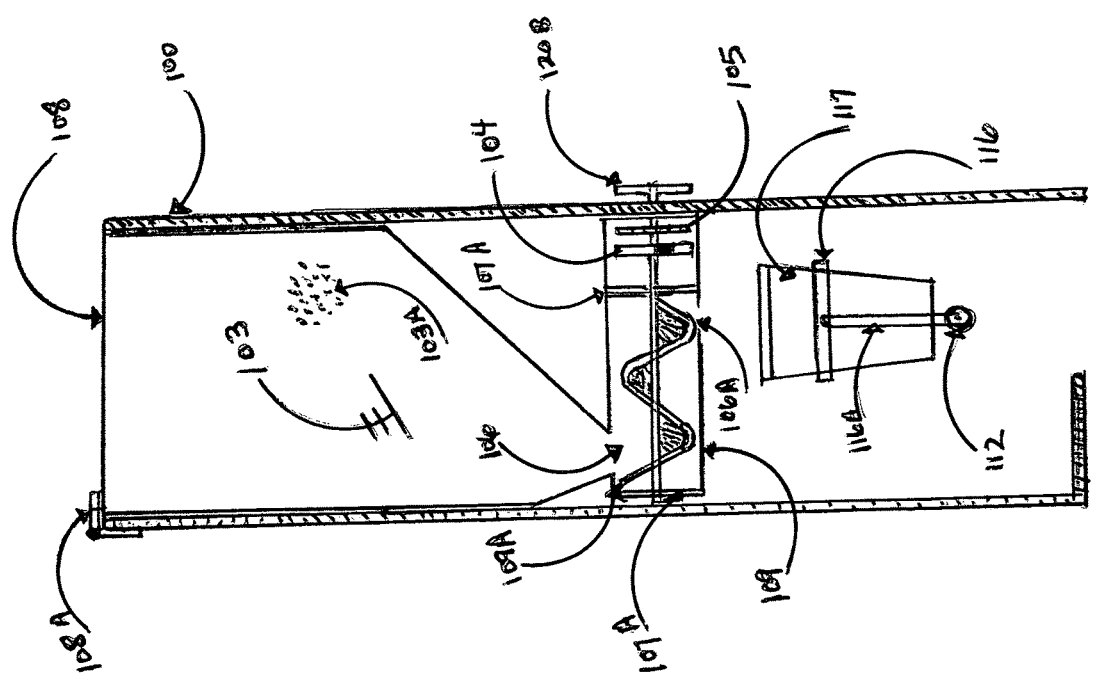
FIG. 3 is another inner view illustrating an auger (assembly/system) used with the portable urine disposal cabinet system according to an embodiment of the present disclosure.
Figure 5:
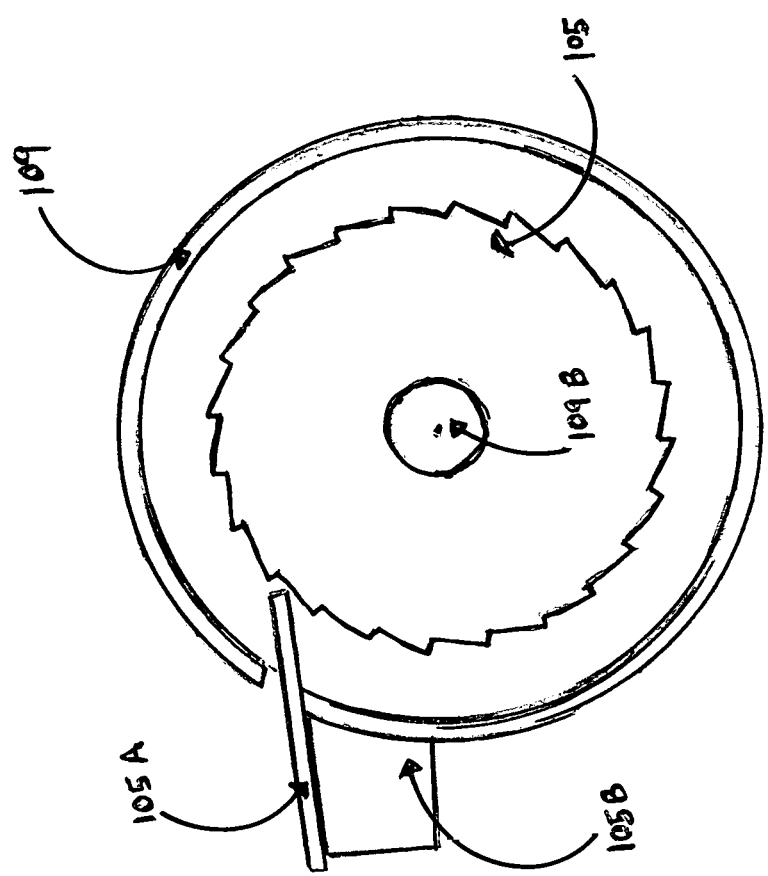
FIG. 5 is a front view illustrating a disk as used to prevent backwards rotation of the auger according to an embodiment of the present disclosure.
Figure 6:
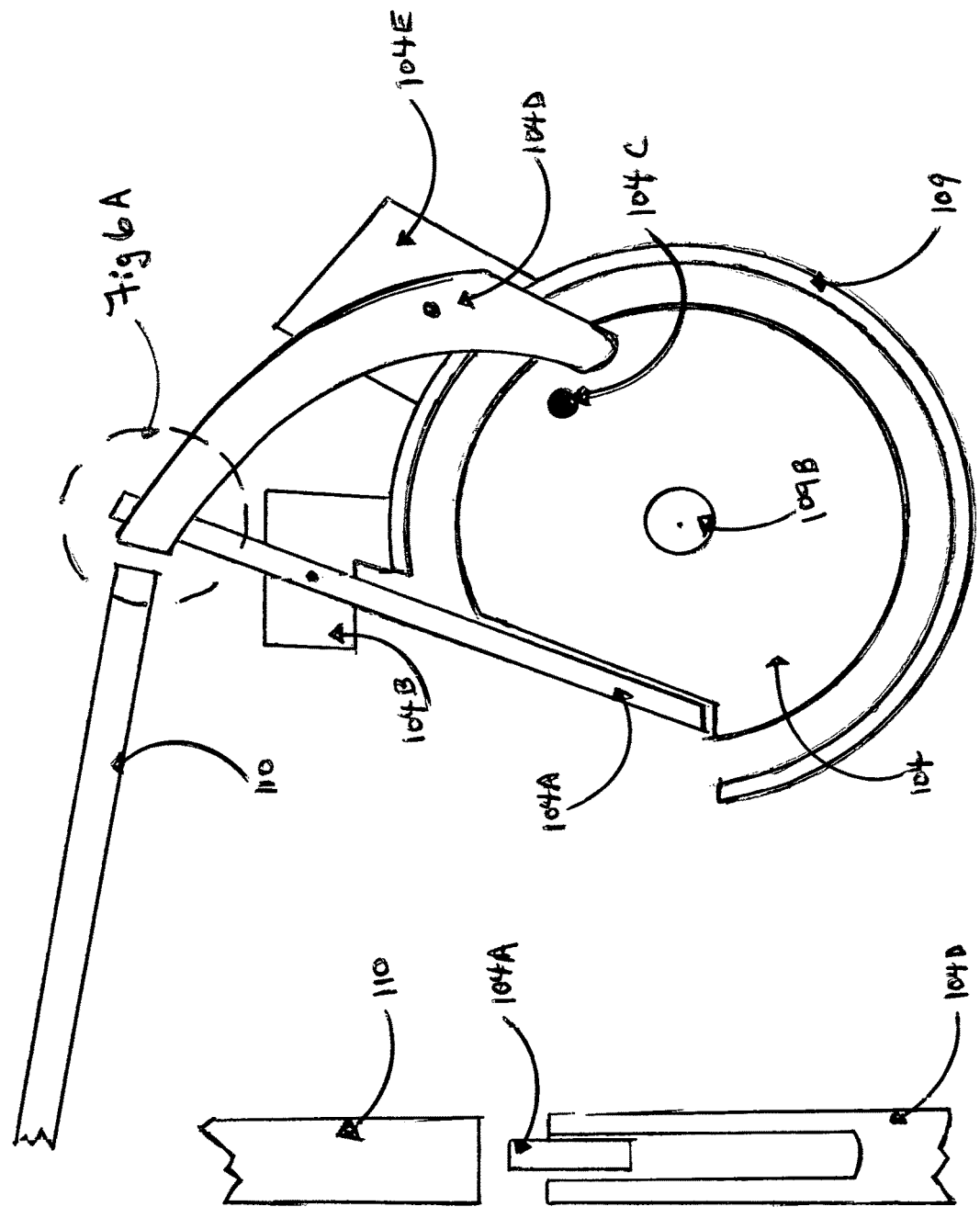
FIG. 6 is a front view illustrating the levering means and disc according to an embodiment of the present disclosure.
Figure 7:
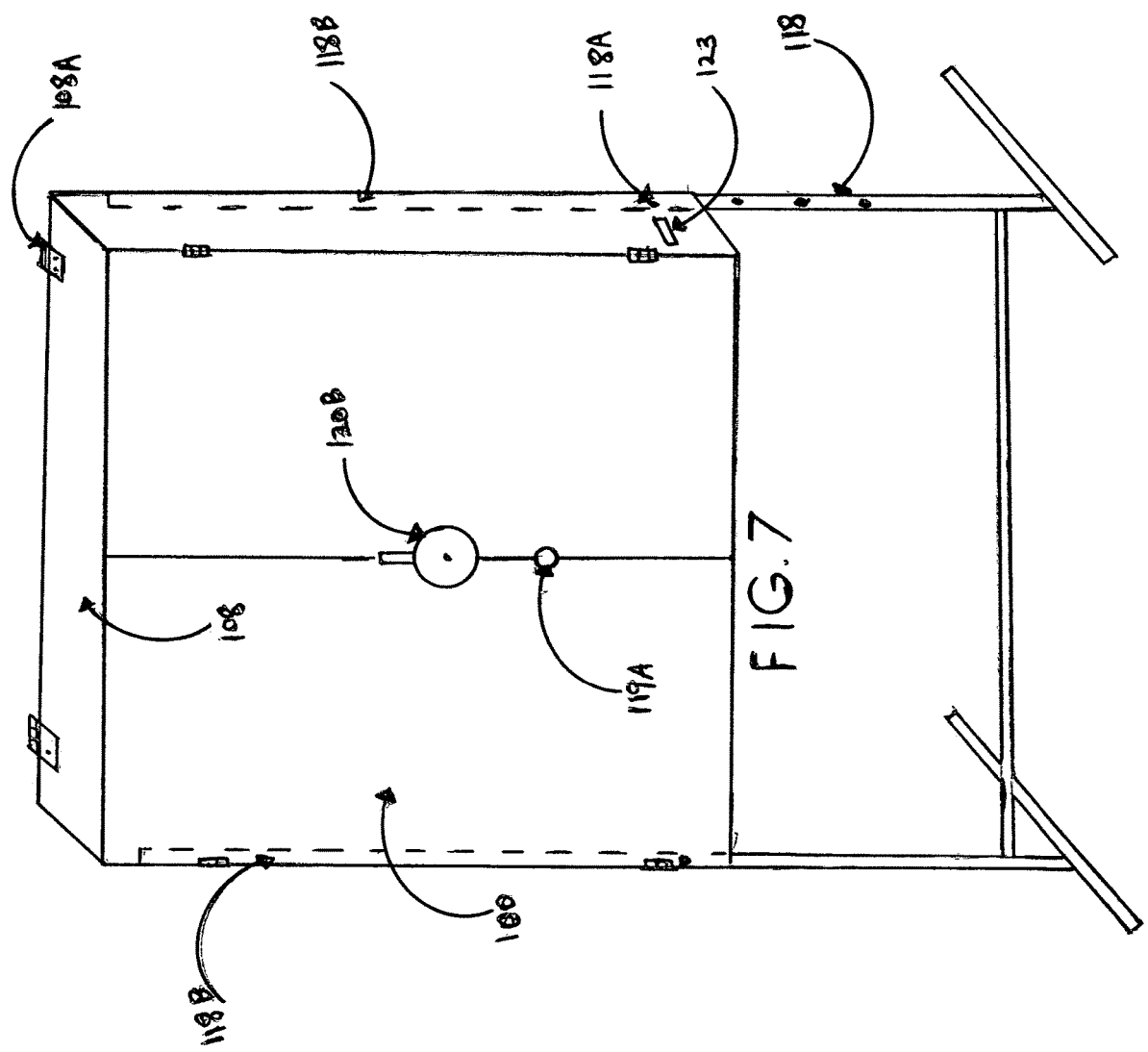
FIG. 7 is a perspective view illustrating the portable urine disposal cabinet system according to an embodiment of the present disclosure.

Referring now to the drawings by numerals of reference there is shown in FIGS. 1-7, a portable, uni-sex and fully self-contained urinal for use in any area where conventional means are not readily available. FIG. 1 shows a view as a user would have standing in front of the urinal cabinet 100, as also illustrated in FIG. 7 where one will first adjust height of the unit. Adjusting is accomplished by holding on to the handles 123 and depressing the spring buttons 118A on either side of the device, see also FIG. 7, and moving unit up or down so the stand 118 slides within the internally mounted tubing 118B and spring buttons with lock into holes of stand at various increments. The urinal's top 108 is hinged by 108A as also shown in FIGS. 3 & 7, this allows the user to fill the hopper 103 with media 103A provided by manufacturer as shown in FIGS. 2 & 3 and load the cups 117 into cup housing 101 as shown in FIG. 2. Various means for adjusting the height and mounting of the present invention may be used.

Opening the vanity wings 119 as shown in FIG. 1, may be accomplished by inserting a finger into hole 119A and pulling open. Pulling next the handle 120 from its recess 121 and moving up to position #1, USE allows the cup holder 116 to be lowered ready to accept the cup. Next the user removes a (20 oz. is preferred) cup 117 from the cup holder 101 as shown in FIG. 2, the dimples 102 allow for one cup at a time to be removed. Next the cup 117 is placed in holder 116 as shown in FIG. 1. Ready to urinate into cup, a female may choose to use a paper funnel stored in niches 122 to aid in her usage of this urinal. Paper funnels may be disposable.

When finished, the handle 120 is moved to position #2, FLUSH where the cup 117 is lifted into position as the handle 120 rotates main shaft 111, see FIG. 2, and moves pitman arm 111B thereby causing the shaft 115 to move downward and is attached with a pivot mount to the lower pitman 114 that is mounted rigidly to and thereby rotating the lower shaft 112. Lower shaft 112 is secured by the pillow block 113 and preferably passes through two bulkheads 107. Cup holder 116 holds the cup 117 vertical via swivel standoff mounts 116A as shown in FIG. 3.

By rotating the handle 120B clockwise one revolution, shown in FIG. 1, this dispenses the proper amount of media into the cup 117. This is accomplished as the handle 120B is attached to the auger shaft 109B and rotates the auger 109A within the housing 109, see FIG. 3, the auger flight diameter and pitch dictates this volume. The media 103A is gravity fed into the auger housing from the hopper 103 through the opening 106 and is contained by two bulkheads, 107A at either end of housing, see FIG. 4. As the auger is rotated, media is moved forward and falls out of housing through opening 106A and into cup 117 via gravity.

Figure 4:
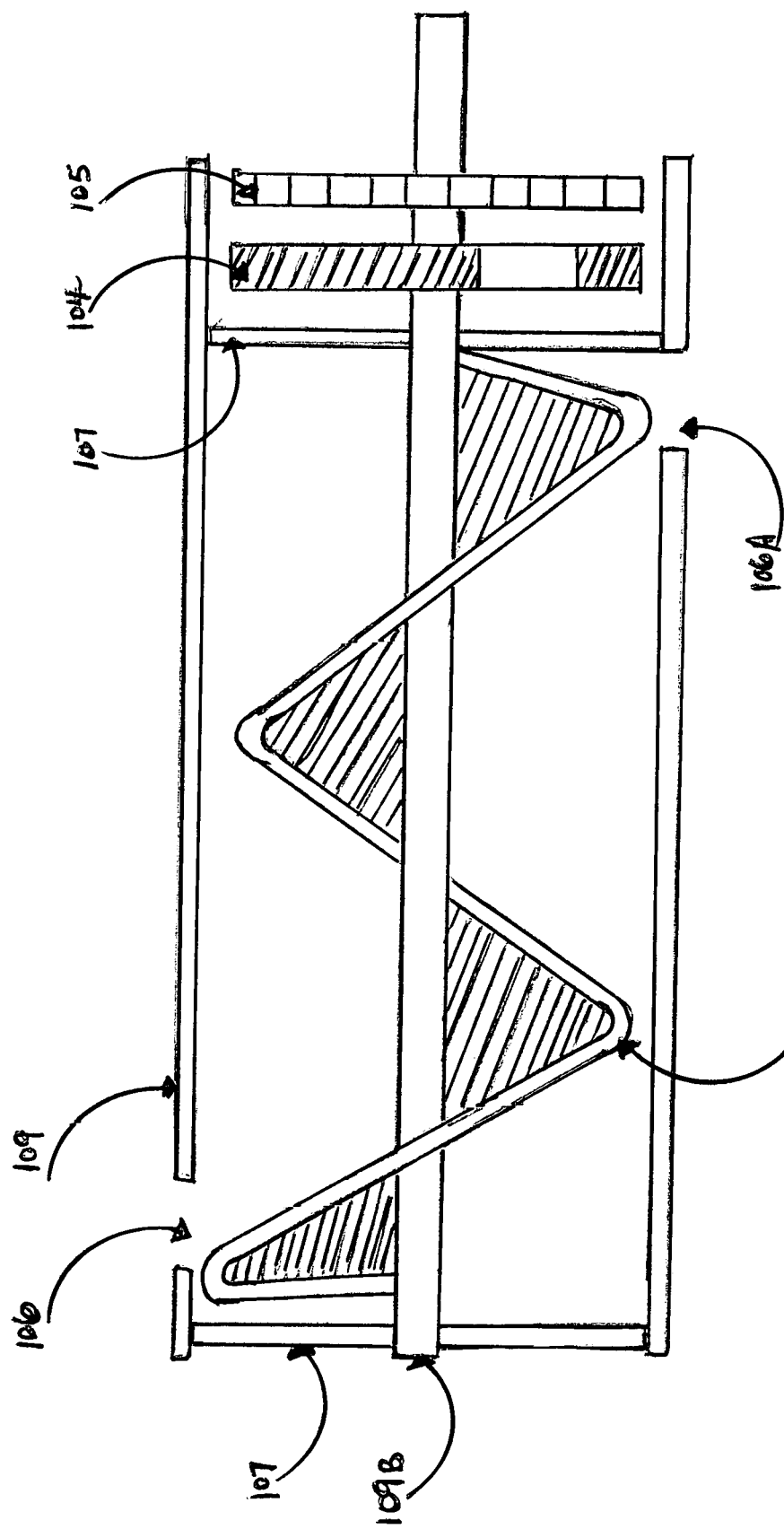
FIG. 4 is a side view illustrating the auger system according to an embodiment of the present disclosure.

The auger assembly shown in FIG. 4 preferably has two discs at the front end, disc 104 shown in FIGS. 4 & 6 allows the auger to be rotated one revolution per usage. Lever 104A rests in a notch in disc 104 and is pushed out of the notch as rod 110 is activated by pitman 111A, see FIG. 2. Rod 110 pushes lever 104A, it is nested in a slot of handle 104D, shown in FIG. 6A and has a pivot mount to housing 109 by mounting block 104B. Referring now to FIGS. 6 and 6A, as disc 104 rotates pin 104C is moved under and makes contact with and through a pivot mount 104E causing lever 104D to push back rod 110 thereby allowing movement in lever 104A so it can reset into a notch as disc 104 makes its completed revolution. This makes the entire cup raising and lowering mechanism to be moved slightly, but does not adversely affect the relationship of the outlet hole 106A to position of the cup 117.

Disc 105 shown in FIGS. 4 & 5 illustrate how the auger assembly is allowed to be rotated in a counterclockwise direction. Lever 105A, mounted to block 105B, that is firmly attached to the housing 109 and rests on top of disc 105 stopping any movement by the notches machined into disc 105 at 15 degree increments. The media neutralizes the odor and gels the urine. Now handle 120 is moved in FIG. 1 to position #4, NEST where cup 117 can be removed and disposed of in an environmentally friendly manner. The handle 120 nests as the vanity wings 119 are closed.

The present invention may be sold as kit with the device, the media, cups, and a set of user instructions. The various components may be sold and shipped separately. The kit has instructions such that functional relationships are detailed in relation to the structure of the invention (such that the invention can be used, maintained, or the like in a preferred manner). The device may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different media combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A self-contained cabinet urinal system comprising:
   a cabinet assembly including a housing defined by an inner volume; and an outer surface;
      at least one granular media hopper containing granular media;
      a mechanical lever assembly;
      a dispenser; and
      a container holder;
   wherein said housing provides mounting for said at least one granular media hopper, said mechanical lever assembly, and said dispenser within said inner volume; and
   wherein said at least one media hopper is structured and arranged to provide said granular media to said dispenser; said dispenser configured for providing a predetermined amount of said granular media for combination with collected urine to render said collected urine suitable for convenient disposal in an absorbed and deodorized condition.

2. The self-contained cabinet urinal system of claim 1 wherein said self-contained cabinet urinal system is manually operated.

3. The self-contained cabinet urinal system of claim 2 wherein said mechanical lever assembly comprises a series of levers.

4. The self-contained cabinet urinal system of claim 3 wherein said dispenser comprises an auger.

5. The self-contained cabinet urinal system of claim 4 wherein said auger comprises at least one flighting which determines a volume of said granular media to be dispensed via a diameter of said at least one flighting and a pitch.

6. The self-contained cabinet urinal system of claim 5 wherein said granular media is dispensed into said container via mechanical manipulation and gravity.

7. The self-contained cabinet urinal system of claim 6 wherein said granular media comprises about 15% activated carbon, about 70% clay granules, and about 15% sodium polyacrylate in mixed combination as dispensed by said cabinet assembly.

8. The self-contained cabinet urinal system of claim 7 wherein said activated carbon minimizes odors emitted from said collected urine.

9. The self-contained cabinet urinal system of claim 8 wherein said sodium polyacrylate comprises wicking means to absorb said collected urine.

10. The self-contained cabinet urinal system of claim 9 wherein said housing comprises vanity wings that when open provide concealment of a user of said self-contained cabinet urinal system during use, said vanity wings are able to open and close.

11. The self-contained cabinet urinal system of claim 10 wherein said mechanical lever assembly is controlled via a handle.

12. The self-contained cabinet urinal system of claim 11 wherein said handle is structured and arranged to turn only one revolution per dispense-usage as regulated by at least one disc.

13. The self-contained cabinet urinal system of claim 12 wherein said handle is structured and arranged to turn only clockwise.

14. The self-contained cabinet urinal system of claim 13 wherein said collected urine once treated by said granular media forms with said granular media into a solidified form when dispensed by said cabinet assembly.

15. A self-contained cabinet urinal system comprising:
a cabinet assembly including a housing defined by an inner volume; and an outer surface;
at least one granular media hopper containing granular media;
a mechanical lever assembly;
a dispenser; and
a container holder;
wherein said housing provides mounting for said at least one granular media hopper, said mechanical lever assembly, and said dispenser within said inner volume;
wherein said self-contained cabinet urinal system is manually operated;
wherein said mechanical lever assembly comprises a series of levers;
wherein said dispenser comprises an auger;
wherein said auger comprises at least one flighting which determines a volume of said granular media to be dispensed via a diameter of said at least one flighting and a pitch;
wherein said granular media is dispensed into said container via mechanical manipulation and gravity;
wherein said housing comprises vanity wings that when open provide concealment of a user of said self-contained cabinet urinal system during use, said vanity wings are able to open and close;
wherein said mechanical lever assembly is controlled via a handle;
wherein said handle is structured and arranged to turn only one revolution per dispense-usage as regulated by at least one disc;
wherein said handle is structured and arranged to turn only clockwise; and
wherein said at least one media hopper is structured and arranged to provide said granular media to said dispenser; said dispenser configured for providing a predetermined amount of said granular media for combination with collected urine to render said collected urine suitable for convenient disposal in an absorbed and deodorized condition.

16. A method of using a self-contained cabinet urinal system comprising the steps of:
providing a cabinet assembly including a housing defined by an inner volume and an outer surface; with at least one granular media hopper containing granular media; a mechanical lever assembly;
a dispenser; and a container holder mounted to said housing;
urinating into a container;
manually operating said mechanical lever assembly to dispense media from said hopper into said container;
and solidifying collected urine with said media for disposal.

17. The method of claim 16 further comprising the step of opening vanity wings that when open provide concealment of a user of said self-contained cabinet urinal system during use, said vanity wings are able to open and close.

* * * * *